United States Patent
Parkansky et al.

(10) Patent No.: US 7,883,606 B2
(45) Date of Patent: Feb. 8, 2011

(54) PRODUCTION OF NANOPARTICLES AND MICROPARTICLES

(76) Inventors: Nahum Parkansky, Hankin 4/5, Raanana 43465 (IL); Raymond Leon Boxman, 97Gil St., Herzliya 46291 (IL)

( * ) Notice: Subject to any disclaimer, the term of this patent is extended or adjusted under 35 U.S.C. 154(b) by 1115 days.

(21) Appl. No.: 10/571,569

(22) PCT Filed: Sep. 9, 2004

(86) PCT No.: PCT/IL2004/000832

§ 371 (c)(1),
(2), (4) Date: Nov. 20, 2006

(87) PCT Pub. No.: WO2005/023406

PCT Pub. Date: Mar. 17, 2005

(65) Prior Publication Data

US 2007/0080054 A1     Apr. 12, 2007

Related U.S. Application Data

(60) Provisional application No. 60/501,399, filed on Sep. 10, 2003.

(51) Int. Cl.
B01J 19/08 (2006.01)
(52) U.S. Cl. .................... 204/178
(58) Field of Classification Search .......... 204/178
See application file for complete search history.

(56) References Cited

U.S. PATENT DOCUMENTS

| 3,355,279 | A | 11/1967 | Ishibashi |
| 6,884,405 | B2 | 4/2005 | Ryzhkov |
| 2004/0026232 | A1 | 2/2004 | Boxman |

OTHER PUBLICATIONS

L. Rapoport et al. "Hollow nanoparticles of WS2 as potential solid-state lubricants", Nature, 387(6635), pp. 791-793, 1997.
Lev Rapoport et al"Fullerene-like WS2 nanoparticles: Superior lubricants for Hard Conditions", Adv. Mater., 15 (7-8), pp. 651-655, 2003).
Sano N et al, Amaratuunga G.A.J , 'brief communications', Nature, 414, 506-507, (2001).
Sano N et al, 'Properties of carbon onions produced by an arc discharge in water' Appl. Phys, 92, pp. 2783-2788, (2002).

*Primary Examiner*—Kishor Mayekar
(74) *Attorney, Agent, or Firm*—Mark M. Friedman

(57) ABSTRACT

A method of producing microparticles including: (a) providing a system including: (i) a vessel containing a liquid; (ii) at least a first pair of electrodes; (iii) a mechanism for igniting an electrical arc between the electrodes; (b) disposing the first pair of electrodes within the liquid, and (c) effecting at least one pulsed electrical discharge between the electrodes so as to produce a plasma bubble, and to produce the microparticles, the microparticles being associated with the plasma bubble, wherein the pulsed electrical discharge has a pulse duration of less than 1000 microseconds, and wherein the pulsed electrical discharge has a current amplitude of at least 1 ampere (A).

43 Claims, 12 Drawing Sheets

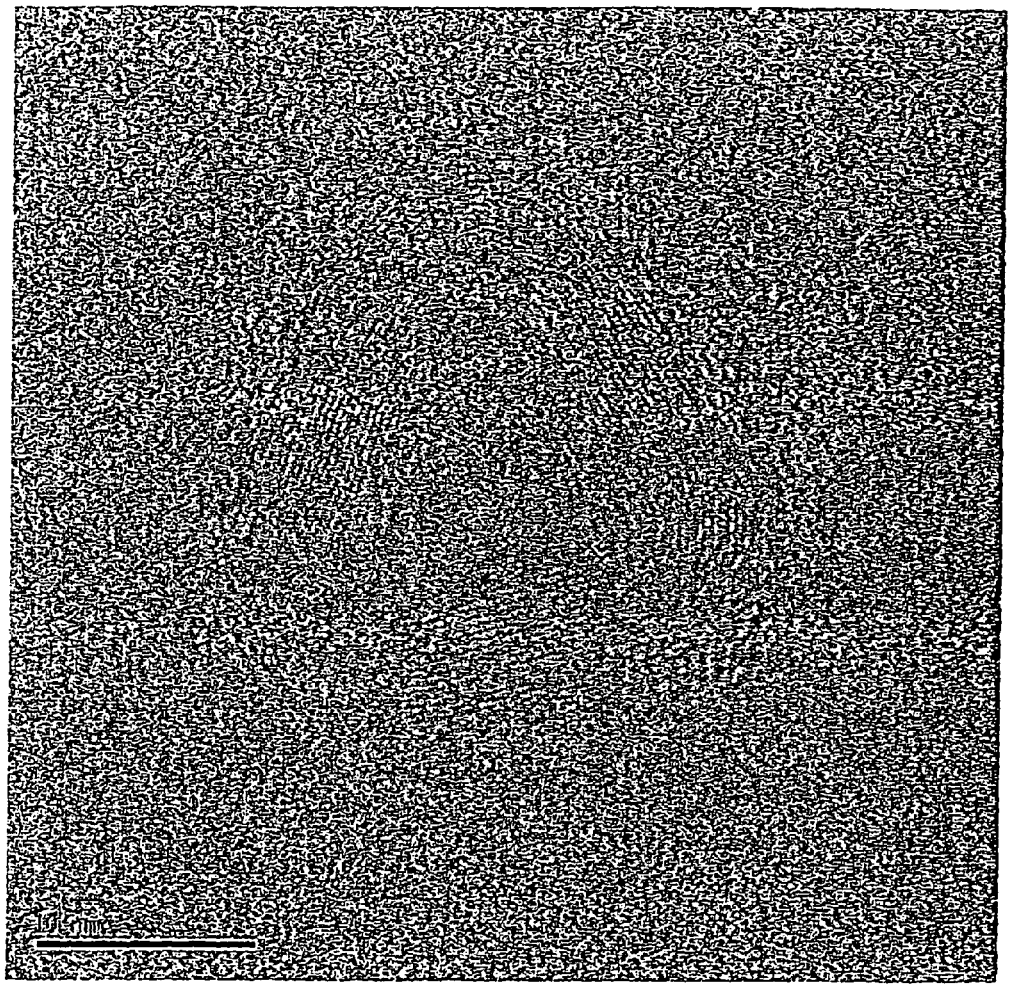
Fig. 2. TEM micrograph of a carbon nanoparticle produced according to the invention.

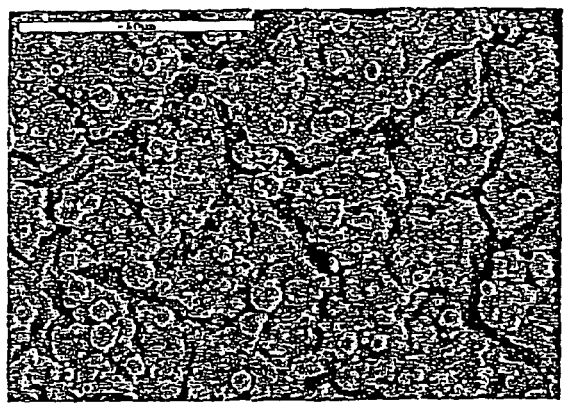
a
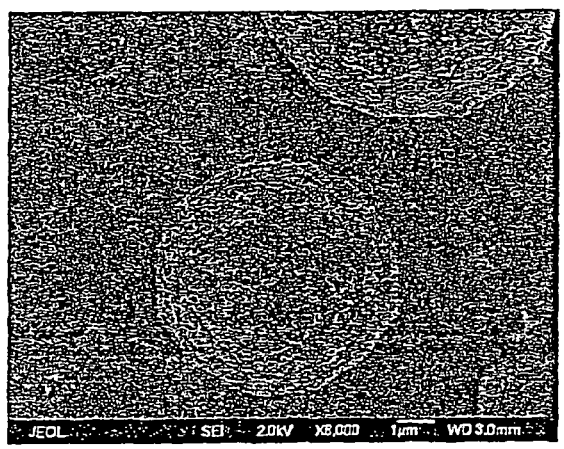
b
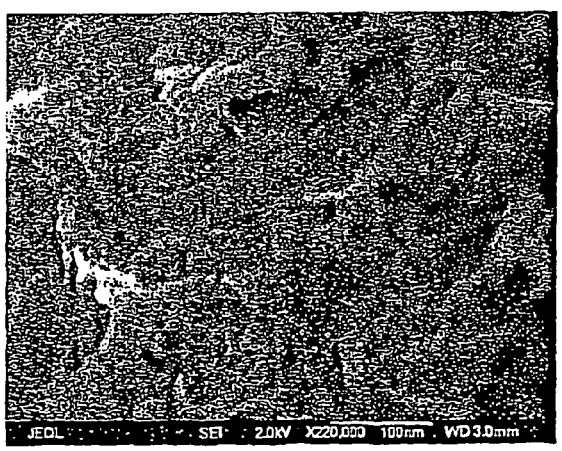
c
Figs. 3a,b,c. SEM micrographs of the micro- and nano-structures obtained using Ni electrodes

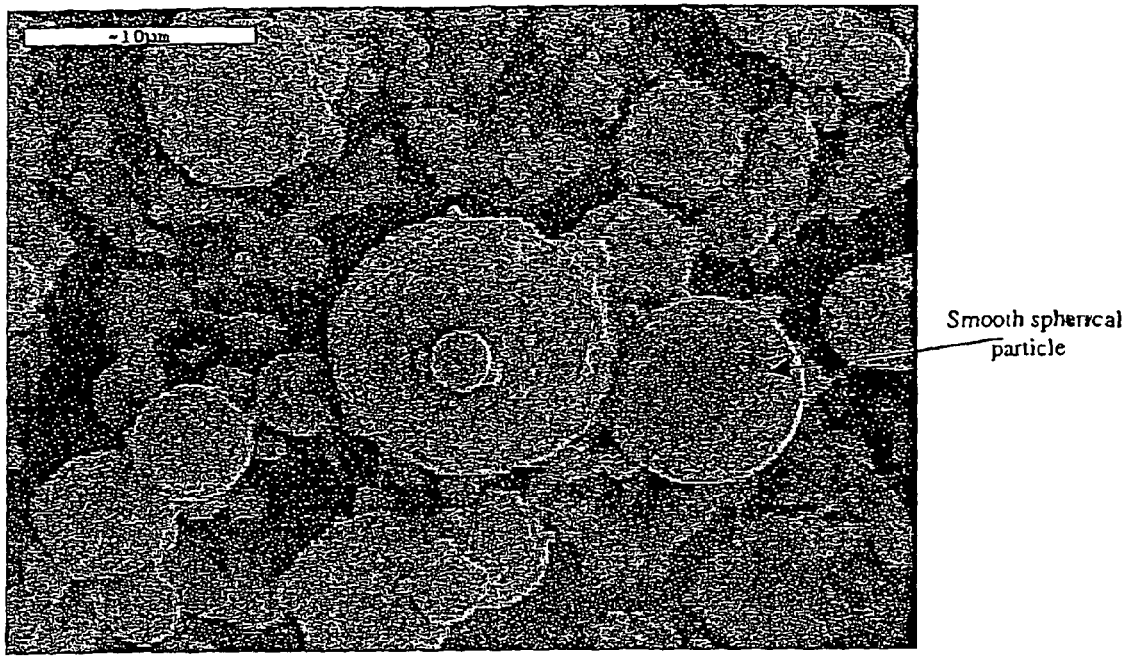
Fig. 4 SEM micrograph of textured and smooth spherical particles

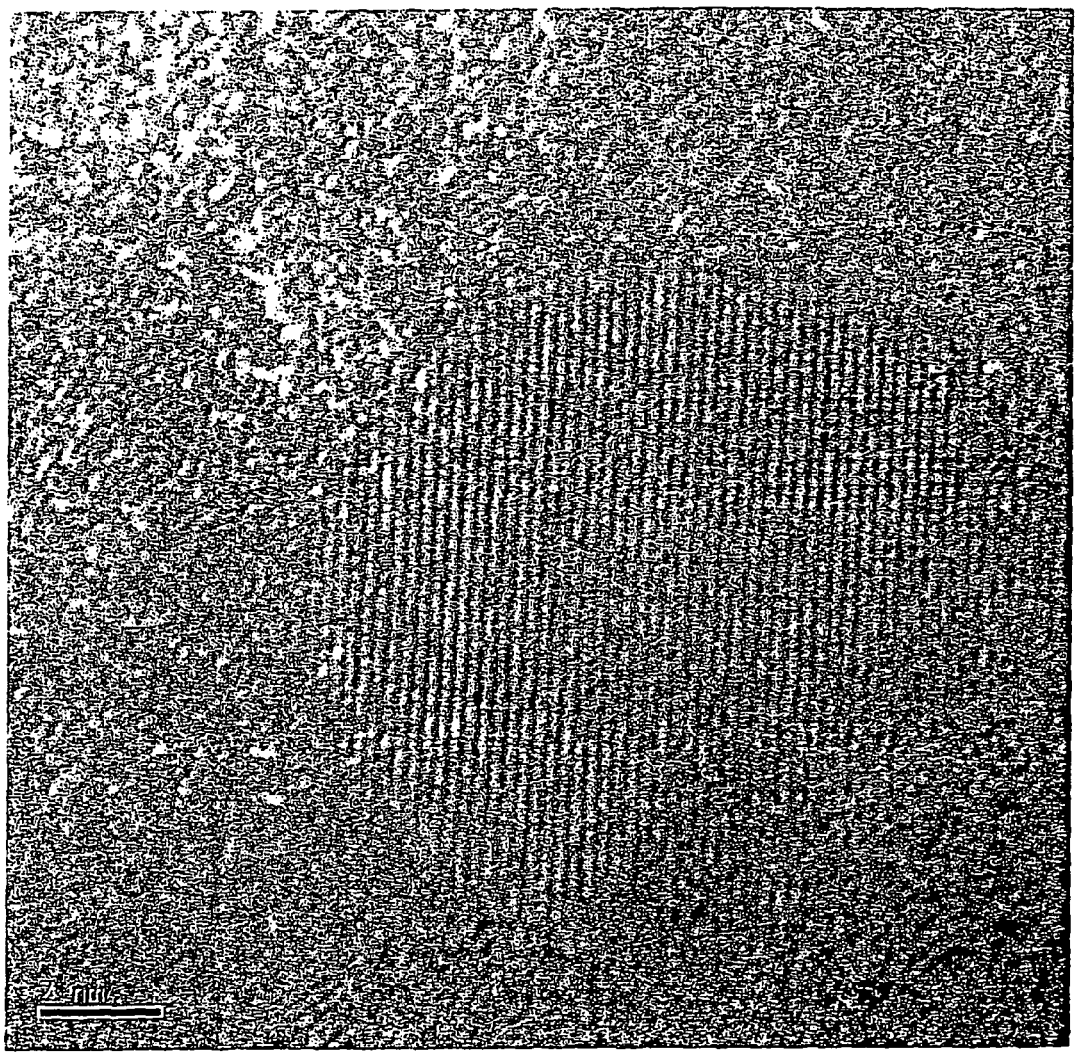
Fig. 5 TEM micrograph of a Ni spherical particle obtained from the "top" liquid

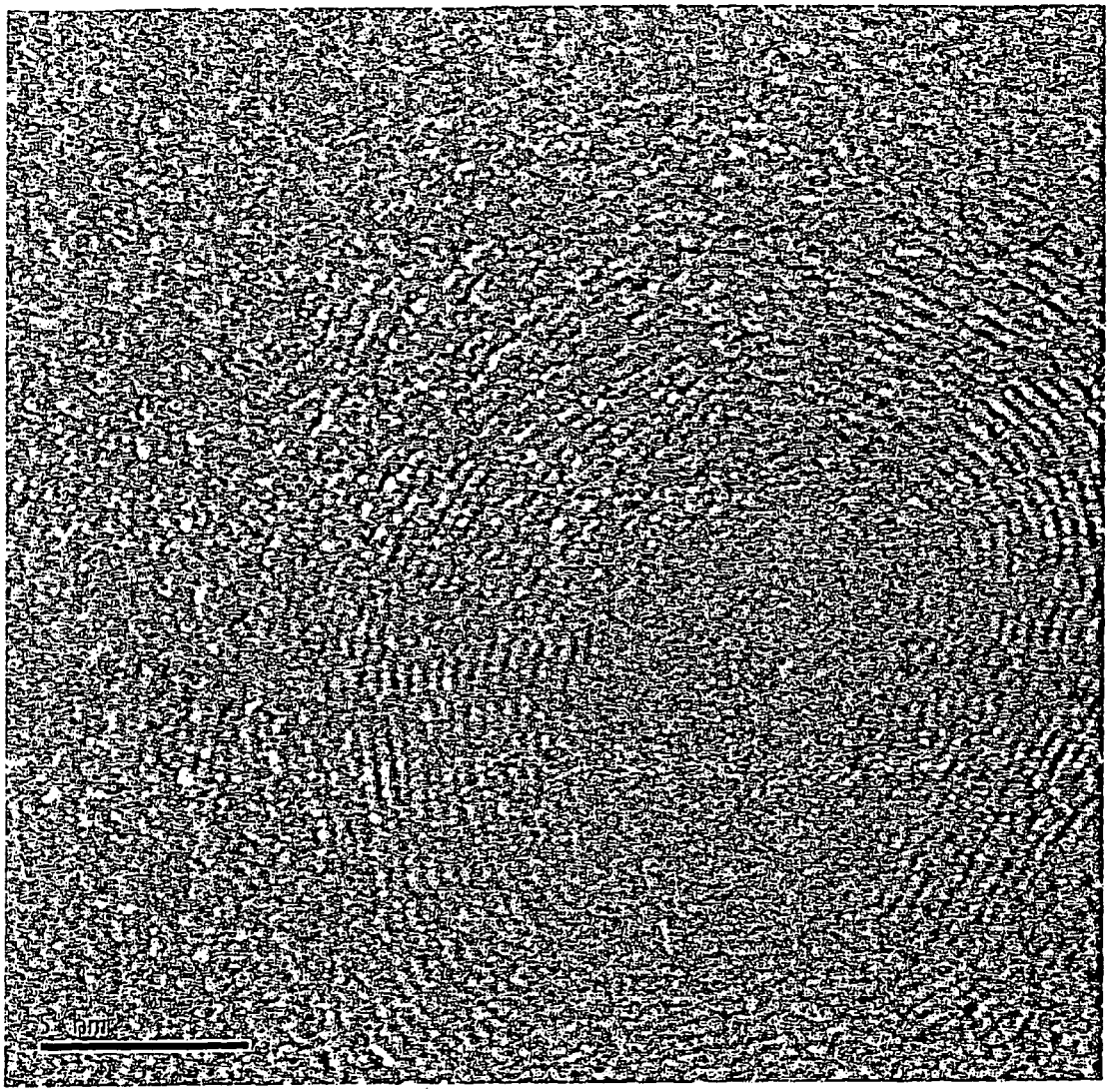
Fig. 6. TEM micrograph of a carbon onion-like structure produced according to the invention.

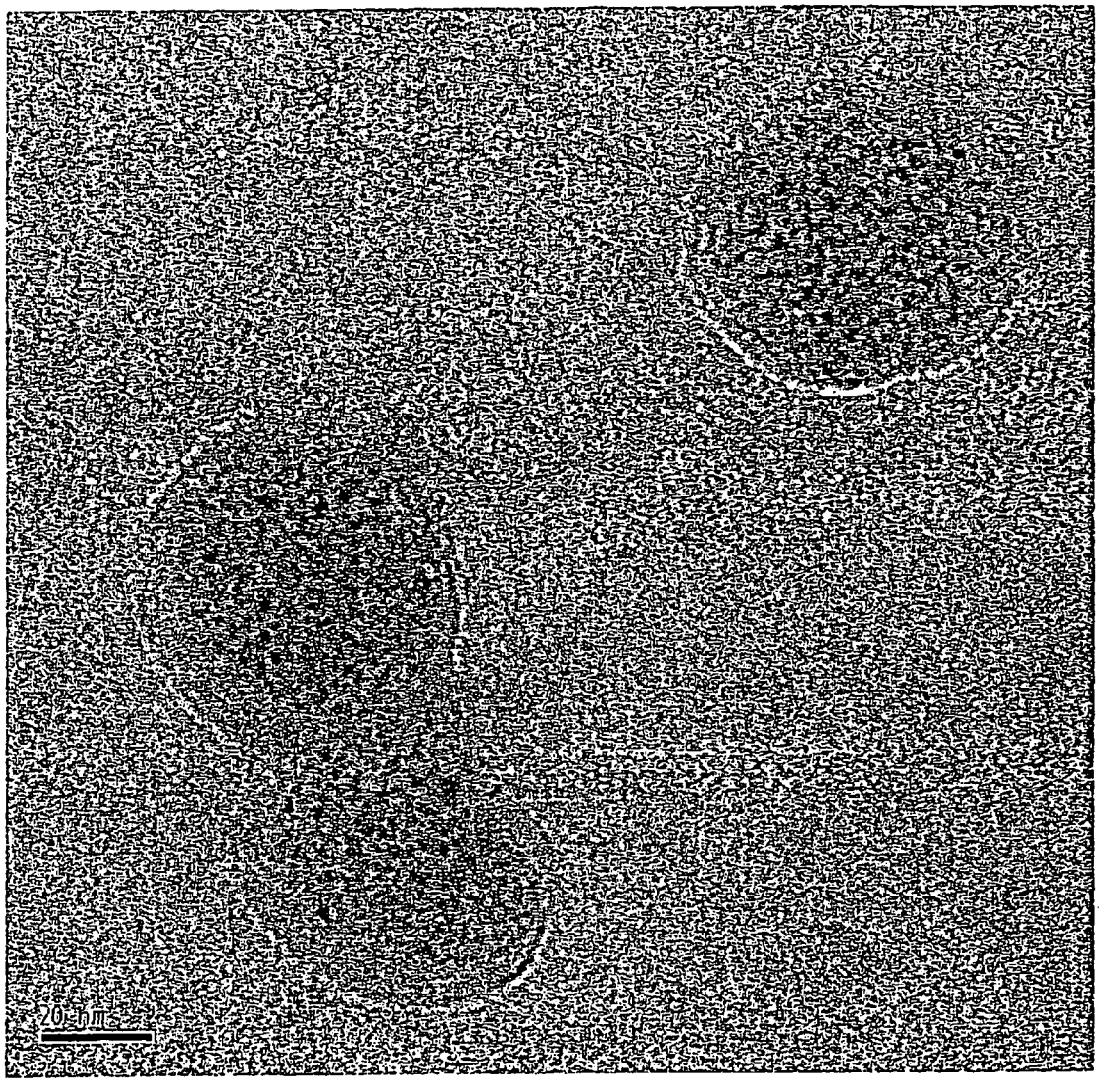
Fig. 7 TEM micrograph of a carbon onion-like clustered together

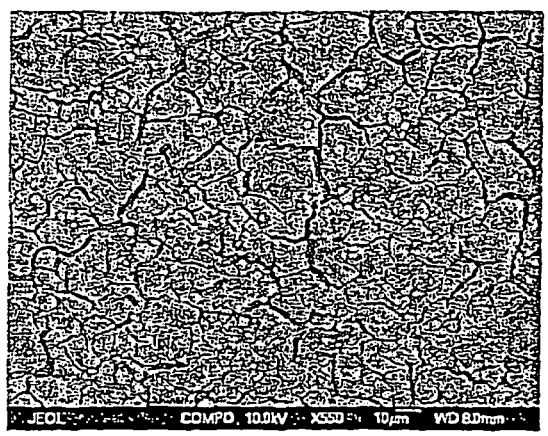
a
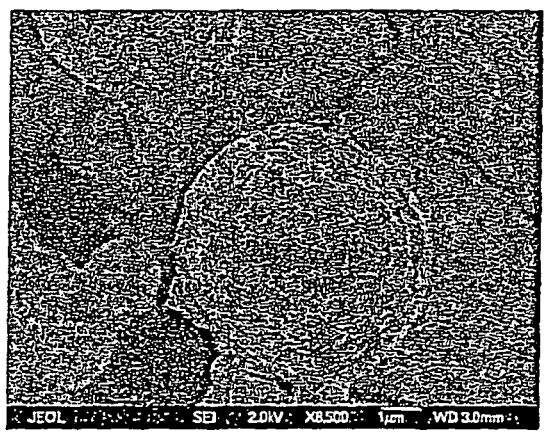
b
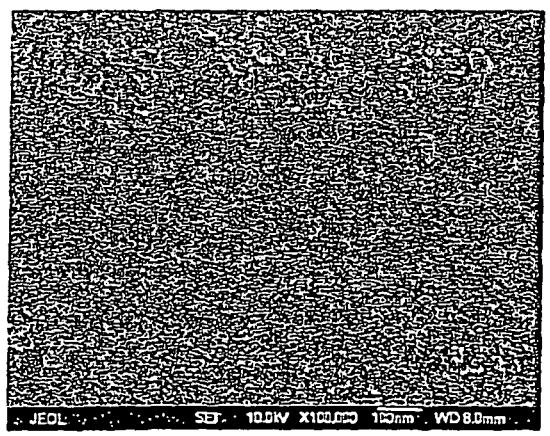
c
Figs. 8 a,b,c SEM micrographs of the micro and nano- structures obtained by using Fe electrodes

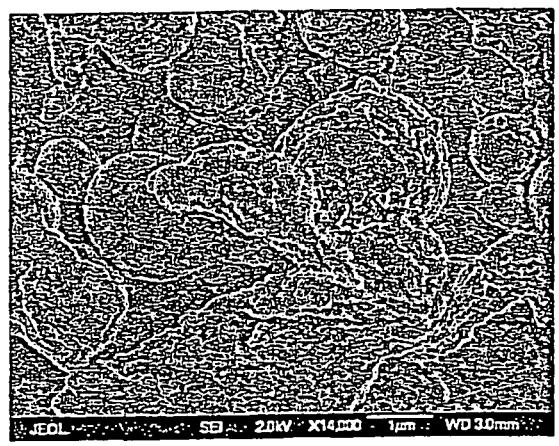
a
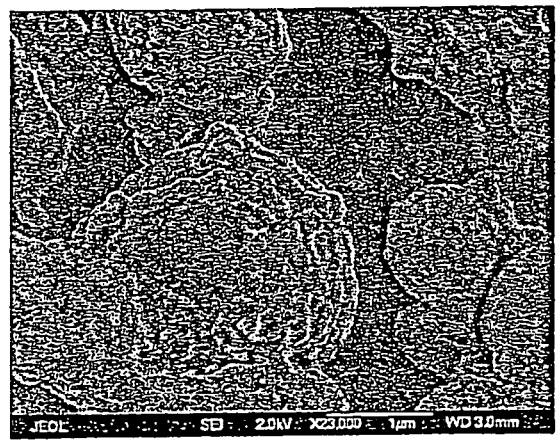
b
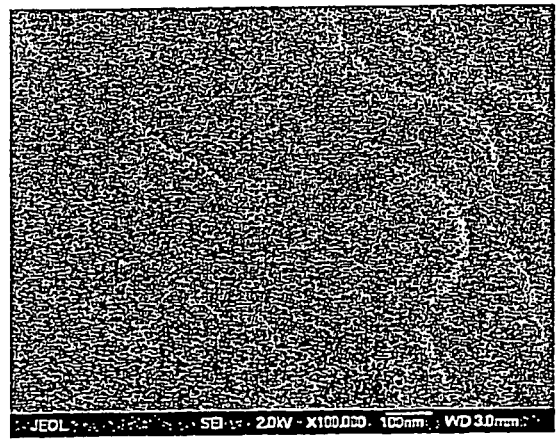
c
Figures 9a,b,c. SEM micrographs of the micro and nano- structures obtained by using W electrodes

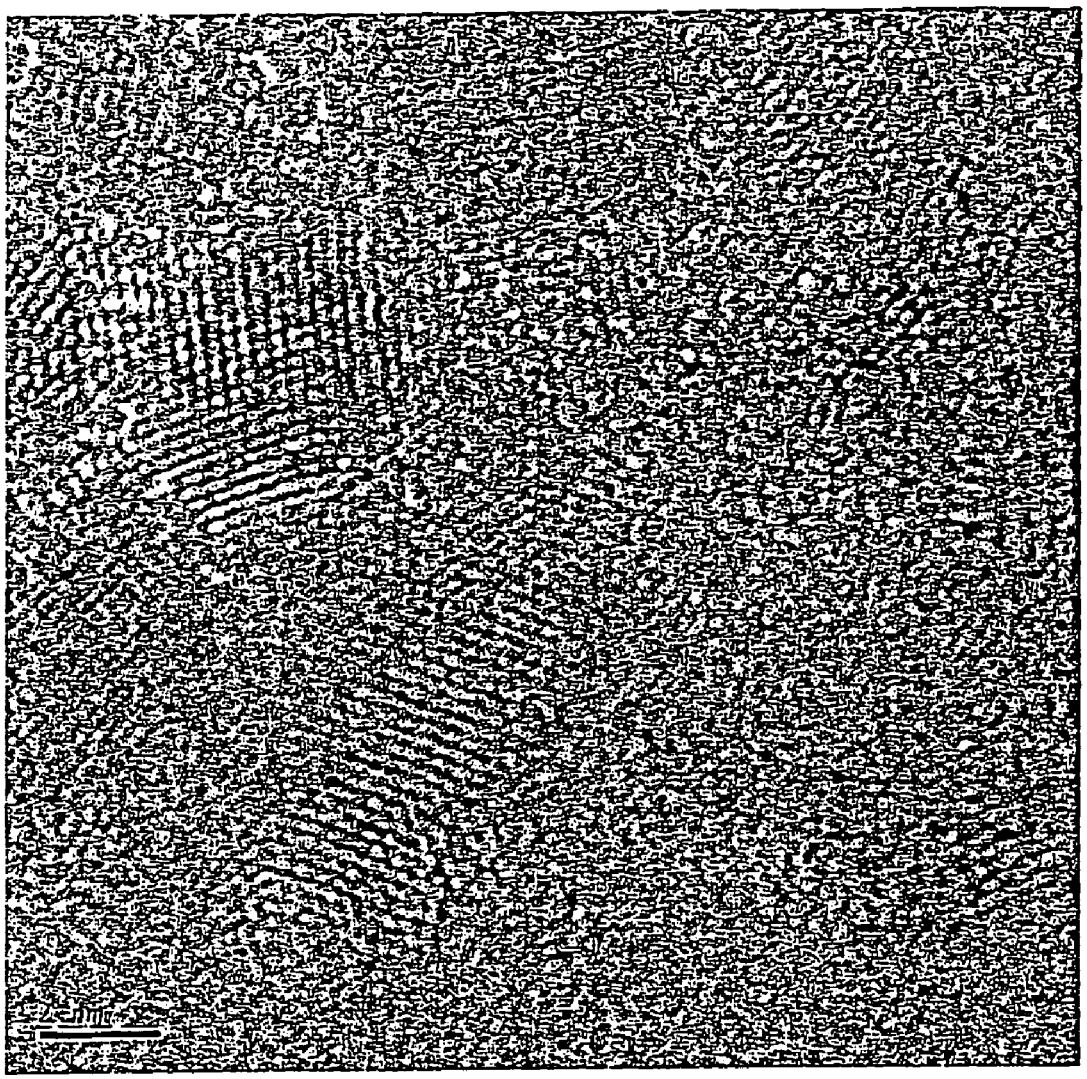
Fig. 10 TEM micrograph of a W particle obtained from the "top" liquid.

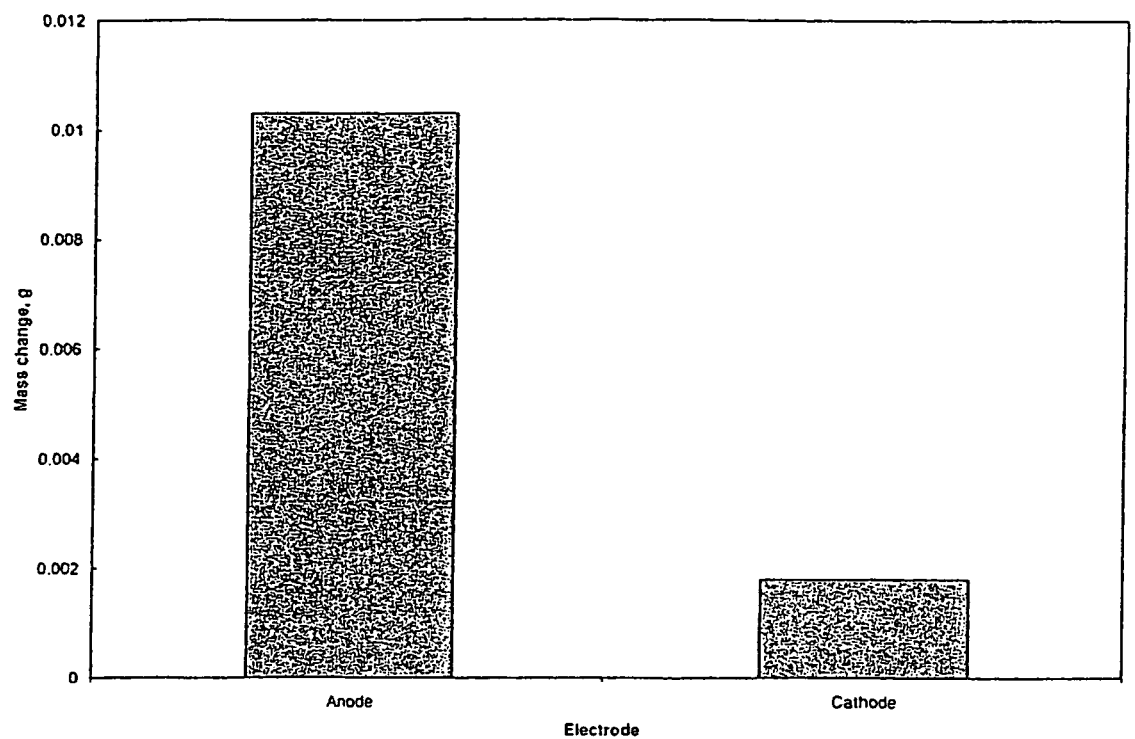
Fig. 11 The diagram of the Ni electrodes mass gain obtained by applying voltage of 500 V d.c between electrodes.

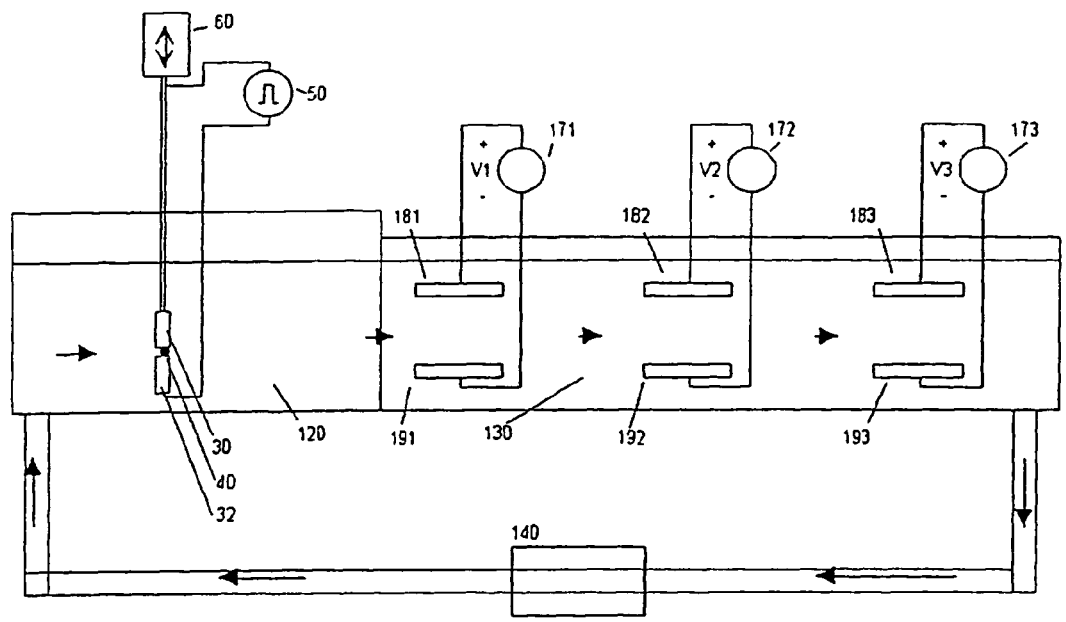
Fig. 12. Schematic diagram of a continuous reactor with particle segregation and collection, according to an embodiment of the invention

PRODUCTION OF NANOPARTICLES AND MICROPARTICLES

This application is a National Stage of the PCT Application PCT/IL04/00832 filed Sep. 9, 2004 and published as WO2005/023406 on Mar. 17, 2005 the entirety of which is incorporated herein by reference. This application also claims the benefit of U.S. Provisional Patent Application No. 60/501,399, filed Sep. 10, 2003.

FIELD AND BACKGROUND OF THE INVENTION

The present invention relates to nanoparticles and microparticles and, more particularly, to a method for producing solid particles with sizes in the nm-μm range.

Nanoparticles and microparticles are becoming increasingly important in various technological applications, inter alia, paints and inks, powder metallurgy, drug delivery, and dry lubricants. Paints and inks are often composed of particles, suspended in a liquid carrier. After being applied to a surface, the liquid carrier evaporates, leaving a solid residue composed of the conglomerated particles. In some technological applications, it is advantageous to have particles with particular electrical or magnetic properties. For example, particles with a high magnetic permeability may be useful in paints that absorb electromagnetic radiation, e.g., radar waves. Particles having an electrical charge may be useful in printing processes in which the direction of the ink jet is controlled with electrostatic steering.

Powder particles are also used in the fabrication of metal and ceramic components, by pressing and sintering. For example, particles such as tungsten carbide (WC) are sintered to form hard cutting tools. Sintered components generally have some degree of porosity, due to the voids between particles. These voids may adversely affect their characteristics. It is believed that the porosity can be reduced, and the properties improved, by using a mixture of powders that includes very small sizes, often termed "nanoparticles", which can fill the voids between larger particles.

Nanoparticles have also been proposed as a drug delivery means. In some such applications, it may be advantageous to have nanoparticles having a nanostructured carbon surface, to which therapeutic molecules can be bound.

Hollow-layered, spherical $MoS_2$ and $WS_2$ nanoparticles have been shown to have excellent lubricating properties, perhaps by acting as ball-bearings on a nanometric scale (Rapoport L, Bilik Y, Feldman Y, Hamyonfer M, Cohen S. R, Tenne R, "Hollow Nanoparticles of $WS_2$ as Potential Solid-State Lubricants", Nature, 387 (6635), 791-793, 1997; Rapoport L, Fleisher N, Tenne R, "Fullerene-like $WS_2$ Nanoparticles: Superior Lubricants for Hard Conditions", Adv. Mater., 15 (7-8), 651-655, 2003). These hollow-layered, spherical nanoparticles are currently manufactured using a lengthy, high-temperature, gas-phase process.

Nanoparticles and microparticles having an electrical charge or a high magnetic permeability may be particularly useful in the rapidly developing field of micro-electro-mechanical systems (MEMS), and particularly in the sub-field wherein fluid elements are integrated with electronic elements on a single chip. Electric or magnetic fields can readily be coupled to charged or magnetic particles respectively, and thus in some applications, it may be advantageous to add particles to the fluid as a means of exerting force on the fluid. Thus, forces coupled to the particles could be transferred to the adjacent fluid, and used to propel the fluid along a channel, or to encourage mixing between two fluids in which the particles are suspended.

Nanoparticles and microparticles are currently manufactured by a variety of chemical and physical processes. In one process, various carbon particles, including carbon nanotubes and carbon nano-onions are produced by maintaining a d.c. arc discharge between graphite electrodes submerged in a passive liquid environment, such as liquid nitrogen or water (see Sano N., Wang H., Chhowalla M., Alexandou I, Amaratuunga G. A. J., Nature, 414, 506, (2001); Sano N., Wang H., Chhowalla M., Alexandou I., Teo K. B. K., Amaratuunga G. A. J., J. Appl. Phys, 92, 2783, (2002)). The carbon nanoparticle is constituted from material eroded from the graphite electrodes. The liquid is believed to play relatively passive roles: evaporation from the liquid provides a vapor bubble atmosphere in which the arc operates, and the liquid may also cool the vapor and quench metastable structures.

Nanoparticles, and in particular, carbon nanotubes, have also been produced using a pulsed arc in air, as taught in our co-pending U.S. patent application Ser. No. 10/615,141 (filed Jul. 9, 2003 and published as United States Patent Application No. 20040026232), which is not to be construed as prior art with respect to the instant application. In this technique as well, the material constituting the particles is eroded from the electrodes, e.g., graphite electrodes in the case of carbon nanotubes. However, unlike the art taught by Sano, et al., a short, pulsed arc is employed, and the fluid contributes material for incorporation into the nanoparticles.

There is therefore a recognized need for, and it would be highly advantageous to have, a method for producing nanoparticles and microparticles that is simple, efficient, and inexpensive with respect to known methods. It would be of particular advantage to have a method for producing nanoparticles and microparticles that incorporates mass from the liquid of the surrounding medium into these nanoparticles and microparticles.

SUMMARY OF THE INVENTION

The present invention is a method for producing nanoparticles and microparticles.

According to the teachings of the present invention there is provided a method of producing microparticles including the steps of: (a) providing a system including: (i) a vessel containing a liquid; (ii) at least a first pair of electrodes; (iii) a mechanism for igniting an electrical arc between the electrodes; (b) disposing the first pair of electrodes within the liquid, and (c) effecting at least one pulsed electrical discharge between the electrodes so as to produce a plasma bubble, and to produce the microparticles, the microparticles being associated with the plasma bubble, wherein the pulsed electrical discharge has a pulse duration of less than 1000 microseconds, and wherein the pulsed electrical discharge has a current amplitude of at least 1 ampere (A).

According to further features in the described preferred embodiments, the pulse duration is less than 100 microseconds.

According to further features in the described preferred embodiments, the pulse duration is less than 50 microseconds.

According to further features in the described preferred embodiments, the pulse duration is less than 30 microseconds.

According to further features in the described preferred embodiments, the pulse duration is less than 10 microseconds.

According to further features in the described preferred embodiments, the pulse duration is less than 3 microseconds.

According to further features in the described preferred embodiments, the pulse duration is less than 1 microsecond.

According to still further features in the described preferred embodiments, the pulsed electrical discharge has a current amplitude of at least 10 A.

According to still further features in the described preferred embodiments, the pulsed electrical discharge has a current amplitude of at least 10 A and less than 100 A.

According to still further features in the described preferred embodiments, the pulsed electrical discharge is repeatedly applied.

According to still further features in the described preferred embodiments, the pulsed electrical discharge is repeatedly applied at a frequency in a range of 10 Hertz to 1 MHertz.

According to still further features in the described preferred embodiments, the electrical discharge is ignited by drawing an arc.

According to still further features in the described preferred embodiments, the microparticles have a particle size distribution (PSD), the method further including the step of: (d) controlling a function of a product (P) of the current amplitude and the pulse duration, so as to control the PSD of the microparticles.

According to still further features in the described preferred embodiments, the microparticles have a particle size distribution (PSD), and wherein the PSD is shifted towards more particles of smaller sizes by decreasing a product (P) of the current amplitude and the pulse duration, the method further including the step of: (d) controlling P so as to control the PSD of the microparticles.

According to still further features in the described preferred embodiments, P is controlled such that the PSD has a median particle size below 100 nanometers.

According to still further features in the described preferred embodiments, P is controlled such that the PSD has a median particle size below 20 nanometers.

According to still further features in the described preferred embodiments, the effecting of the pulsed electrical discharge is controlled such that the liquid contributes atoms to the microparticles.

According to still further features in the described preferred embodiments, the liquid includes an alcohol.

According to still further features in the described preferred embodiments, the liquid includes kerosene.

According to still further features in the described preferred embodiments, the liquid contains atoms of sulfur.

According to still further features in the described preferred embodiments, the liquid contains atoms of at least one of the elements selected from the group consisting of molybdenum, tungsten, and sulfur.

According to still further features in the described preferred embodiments, at least one of the first pair of electrodes is a metal.

According to still further features in the described preferred embodiments, at least one of the first pair of electrodes contains a material selected from the group consisting of iron, nickel, tungsten, and carbon.

According to still further features in the described preferred embodiments, at least one of the first pair of electrodes is fabricated from graphite.

According to still further features in the described preferred embodiments, at least one of the first pair of electrodes is fabricated from silicon.

According to still further features in the described preferred embodiments, the pulsed electrical discharge between the electrodes is a plurality of pulsed electrical discharges, the discharges being effected by a periodical contacting of a first electrode of the first pair of electrodes with a second electrode of the first pair of electrodes.

According to still further features in the described preferred embodiments, one of the first pair of electrodes is mounted on a vibrating mechanism which effects the periodical contacting between the first pair of electrodes.

According to still further features in the described preferred embodiments, the effecting of the pulsed electrical discharge is controlled so as to collapse the plasma bubble.

According to still further features in the described preferred embodiments, the method further includes the step of: (d) removing the microparticles produced by the electrical discharge.

According to still further features in the described preferred embodiments, the removing of the microparticles is effected by evaporation of the liquid.

According to still further features in the described preferred embodiments, the removing of the microparticles is effected by sedimentation.

According to still further features in the described preferred embodiments, the method further includes the step of: (d) effecting a classification of the microparticles produced by the electrical discharge.

According to still further features in the described preferred embodiments, the classification includes classification based on a relative particle size of the microparticles.

According to still further features in the described preferred embodiments, the classification includes classification based on a magnetic property of at least a portion of the microparticles.

According to still further features in the described preferred embodiments, the classification includes classification based on an electrical property of at least a portion of the microparticles.

According to still further features in the described preferred embodiments, the microparticles have an electrical charge when disposed in the liquid, and wherein the removing is effected by: (i) placing at least one collector electrode into the liquid; (ii) imposing a bias voltage upon the collector electrode; (iii) allowing the microparticles to be attracted to the collector electrode having the bias voltage, and (iv) removing the collector electrode from the liquid.

According to still further features in the described preferred embodiments, the microparticles have a magnetic charge, and wherein the removing is effected by: (i)
placing a magnet in the liquid; (ii) allowing the microparticles to be attracted to the magnet, and (iii) removing the magnet from the liquid.

According to still further features in the described preferred embodiments, the removing of the microparticles is effected by at least one collector placed in the liquid, and the liquid is caused to flow from the electrodes to the collector.

According to still further features in the described preferred embodiments, the liquid, after flowing to the collector, is re-circulated to a vicinity of the electrodes.

According to still further features in the described preferred embodiments, the liquid is added to the vessel in controlled amounts.

According to still further features in the described preferred embodiments, the removing of the microparticles is effected by at least two collector electrodes, the collector electrodes being disposed at different depths within the liquid.

According to still further features in the described preferred embodiments, the removing of the microparticles is effected by removing a portion of the liquid from a specified height from a bottom of the vessel.

According to still further features in the described preferred embodiments, the height is within an upper 10% of a height of the liquid within the vessel.

According to another aspect of the present invention there is provided an apparatus for producing particles including: a vessel for holding a liquid, at least one pair of electrodes, a mechanism for positioning one electrode of the pair with respect to the other electrode of the pair, a mechanism for generating a pulsed electrical discharge between the two electrodes of the electrode pair, and a mechanism for removing the particles.

According to further features in the described preferred embodiments, the mechanism for removing the particles includes at least one collector electrode and means of applying a bias voltage to the collector electrode.

According to still further features in the described preferred embodiments, the mechanism for removing the particles includes at least one magnet, and means for inserting and removing the magnet from the vessel.

According to still further features in the described preferred embodiments, the apparatus additionally includes: a mechanism for causing the liquid to flow from the electrode pair to a vicinity of the particle removal means.

According to still further features in the described preferred embodiments, the apparatus additionally includes: means for re-circulating the liquid from the particle removal means back to the vicinity of the electrode pair.

According to another aspect of the present invention there is provided a particle including: a metal and carbon, the particle having a substantially spherical shape, the particle having a diameter between 10 nm and 25 µm, and wherein a composition of the particle varies as a function of a distance from a center of the particle, such that a fraction of the metal decreases and a fraction of the carbon increases.

According to still further features in the described preferred embodiments, the particle has a nano-textured surface.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIG. 2 is a TEM micrograph of a carbon nanoparticle produced according to one embodiment of the present invention;

FIGS. 3a, b, c are SEM micrographs of the micro-structures and nano-structures obtained using Ni electrodes, according to an embodiment of the present invention;

FIG. 4 is a SEM micrograph of textured and smooth spherical particles produced according to an embodiment of the present invention;

FIG. 5 is a TEM micrograph of a Ni spherical particle obtained from the "top" liquid, according to another aspect of the present invention;

FIG. 6 is a TEM micrograph of a carbon onion-like structure produced according to an embodiment of the present invention;

FIG. 7 is a TEM micrograph of clusters of carbon onion-like particles produced in accordance with the present invention;

FIGS. 8a, b, c are SEM micrographs of the micro-structures and nano-structures obtained by using Fe electrodes according to an embodiment of the present invention;

FIGS. 9a, b, c are SEM micrographs of the micro-structures and nano-structures obtained by using W electrodes, in accordance with the present invention;

FIG. 10 is a TEM micrograph of a W particle obtained from the "top" liquid, in accordance with the present invention;

FIG. 11 is a graph of the mass gain by electrodes obtained by applying voltage of 500 V d.c between the electrodes, which were inserted into a liquid previously treated by an arc between Ni arc electrodes, and FIG. 12 is a schematic diagram of a continuous reactor with particle segregation and collection, according to yet another embodiment of the invention.

DESCRIPTION OF THE PREFERRED EMBODIMENTS

Figure 1:
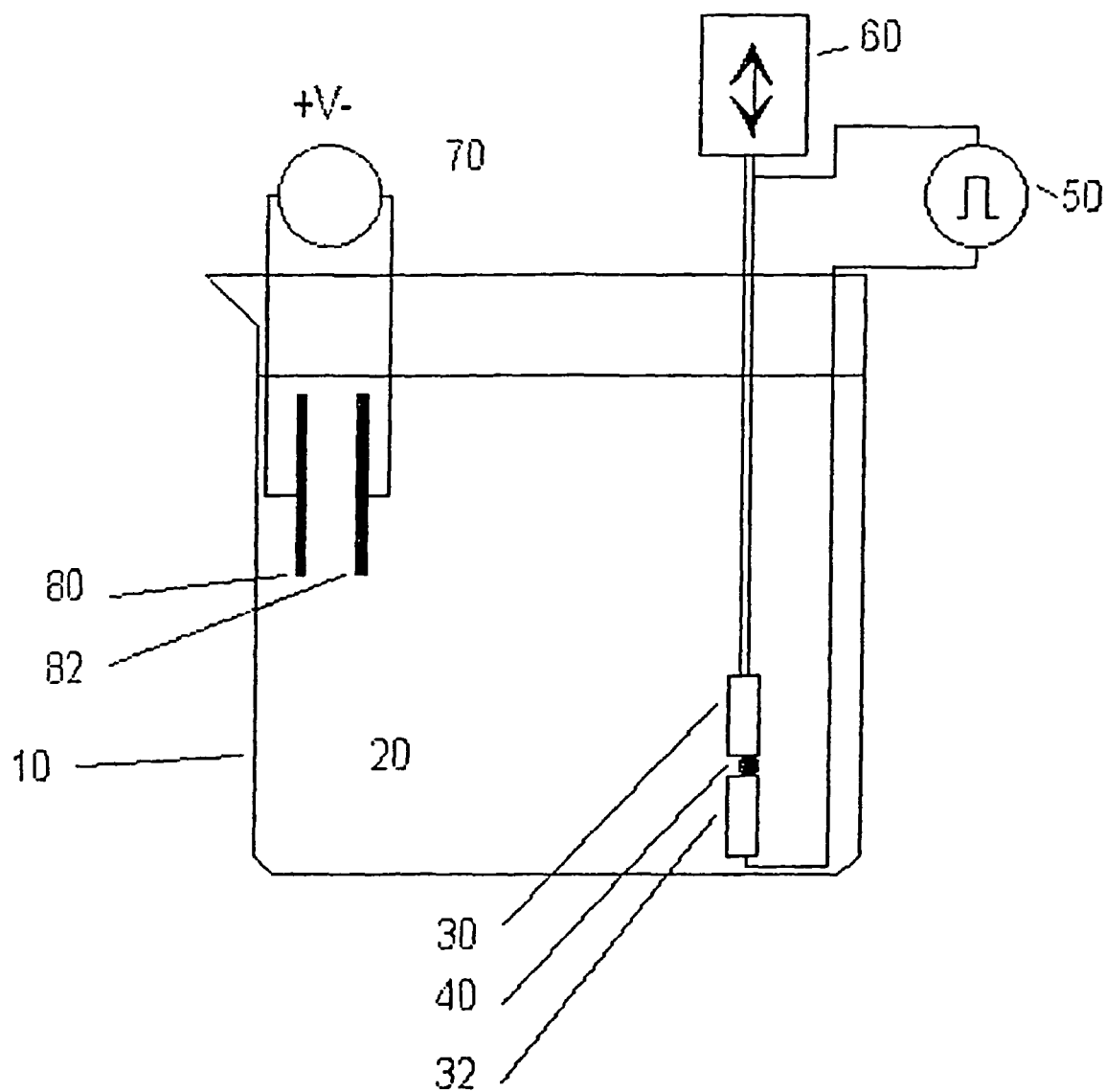
FIG. 1 is a schematic diagram of the invention apparatus.

The present invention is a method for producing nanoparticles and microparticles, and various novel particles produced by this method. The apparatus includes a vessel containing a liquid whose composition includes elements that are for incorporating into the particles, a pair of electrodes, and means to ignite an electrical arc between the electrodes. In some embodiments of the invention, additional electrodes are placed in the vessel, and attached to a d.c. power supply in order to collect particles. The particles are produced by igniting a pulsed arc discharge in the liquid, thus producing a plasma bubble, which may contain material eroded from the electrodes and evaporated from the liquid. The particles formed will generally be suspended in the liquid. Various particles may preferentially float on the liquid surface, or settle onto the bottom of the vessel. In some cases, the particles can be removed using a magnet, or by collecting the particles on an electrically biased collector electrode. Novel particles include particles with a metal-rich core surrounded by a carbon-rich shell, magnetic particles, and electrically charged particles.

In the description of the present invention, the term "particle" is used generically to describe particles of various compositions and shapes.

The principles and operation of the microparticle production method according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

The basic principle of the invention is described by referring to the exemplary schematic illustration provided in FIG. 1. A vessel 10 contains a liquid 20 whose composition includes elements to be incorporated into particles. A pulsed arc discharge is produced between a pair of arc electrodes, 30 and 32, producing a plasma bubble 40 in the vicinity of electrodes 30 and 32. Electrical current and voltage are produced by a pulsed power supply 50. The position of electrode 30 with respect to electrode 32 is determined by mechanism 60.

The arc discharge may be ignited by several methods. In one preferred embodiment of the invention, a "contact mode" is employed wherein mechanism 60 produces a periodic vibrating motion such that electrode 30 periodically contacts, and breaks contact, with electrode 32. Power supply 50 allows electrical current to flow when electrode 30 is in contact with electrode 32, which continues when the contact is broken, by means of a "drawn arc" discharge. The contact mode requires a relatively low voltage from power supply 50.

In an alternative preferred embodiment, a "breakdown mode" is employed to ignite the arc. In this mode, electrode 30 may remain stationary. The arc is ignited by initially applying a relatively high voltage from power supply 50, which breaks down the gap between electrodes 30 and 32.

Particles are produced within, or in the vicinity of, the plasma bubble 40, during, or shortly after, the electrical pulse. After the pulse, the plasma bubble collapses, and at least some of particles produced are either directly deposited on arc electrodes 30 and 32, or initially suspended in the liquid 20. In a preferred embodiment of the invention, pulses are applied periodically by power supply 50, and thus, new particles are injected into the liquid 20 with each pulse. In some embodiments of the invention, a variety of sizes and types of particles are produced. Some degree of particle segregation occurs with time, wherein some types or sizes of particles preferentially float on the surface of the liquid, while other preferentially settle to the bottom of the vessel.

Particles can be removed from the liquid by several means. Liquid can be removed from the vessel and transferred to a surface from which the liquid evaporates, leaving behind a residue containing the particles. In one embodiment, the surface is heated in order to accelerate the evaporation.

In another preferred embodiment, the liquid is removed preferentially or selectively from a given height within vessel 20, e.g., from the surface of the liquid or from the bottom surface of vessel 10. Various alternative separation processes may then be implemented. For example, the liquid in the vessel may be selectively removed by evaporation, and the solid residue containing the particles can then be removed from the walls of the vessel or from substrates placed on the walls of the vessel. Alternatively, magnetic particles are removed by immersing a magnet into vessel 10, attracting magnetic particles to the magnet, and removing the magnet with particles clinging thereto.

In another preferred embodiment, some types of particles are removed electrically by inserting at least one additional collector electrode into liquid 20, and applying a bias voltage to the additional collector electrode. In one exemplary implementation, shown schematically in FIG. 1, a pair of electrodes 80 and 82 is inserted into liquid 20, and a d.c. voltage is applied between them from a second power supply 70. With a suitable voltage polarity and amplitude, particles are attracted to the collecting electrode. The collector electrode can then be removed, together with the particles clinging thereto. The collection on the collector electrode may proceed in parallel to pulsed arc production near the arc electrodes.

In one preferred embodiment, the liquid 20 is allowed to flow, or is forced to flow, from the vicinity of electrodes 30 and 32 to the vicinity of the collector electrodes, transporting the particles with it. In another preferred embodiment, a sequence of pulsed arcs is first applied, and the particles are subsequently collected by applying a voltage by means of second power supply 70, after the sequence of pulses from power supply 50 is completed.

As described hereinabove, liquid 20 can be evaporated from vessel 10, leaving a residue containing the particles on the interior surfaces of vessel 10. This residue can then be collected. Particle separation processes based on evaporation are relatively favorable when a volatile material such as alcohol is used for liquid 20. Alternatively, liquid-containing particles are removed from the vessel and filtered, such that particles are collected on the filter. Various filtering techniques are known in the art, including vacuum-filtering and pressure-filtering. Washing and/or repulping steps may be applied, as necessary.

The electrode materials may be any material which will sustain an electrical discharge. In a preferred embodiment, the electrodes are fabricated from conducting materials such as metals (e.g., W, Mo, Fe, Ni, Co, Zn, Au, Ag, Pt) or semiconductors (e.g., graphite, Si). In other embodiments, the electrodes may have a conducting core and an insulating coating.

Liquid 20 may be selected from at least one of a variety of materials, including organic fluids (e.g., alcohol, kerosene, paraffin oil, etc.), or solutions containing a solute such as an acid or a salt. One criterion for choosing the electrode and liquid materials is the composition of the particles to be produced, as these particles are generally advantageously constituted from some combination of the constituents of the liquid and electrode materials.

Arc electrodes 30 and 32 can have various shapes, including, by way of example, two rods as depicted in FIG. 1, or a rod for one electrode, and a flat coupon for the second electrode. The pulse parameters (e.g., peak current, waveform, pulse duration, repetition frequency) can be varied over a wide range. Such variation will generally influence the nature and size of the particles produced. Generally smaller particles will be produced as the pulse duration is decreased, with all other parameters held constant.

EXAMPLES

Reference is now made to the following examples, which together with the above descriptions, illustrate the invention in a non-limiting fashion. Exemplary particles were produced using the common features/parameters detailed in Table 1.

TABLE 1

Common Features in the Examples

| Parameter or Feature | Value |
|---|---|
| Vessel | Plastic Cup, 60 ml volume |
| Liquid | Ethyl Alcohol ($C_2H_5OH$) |
| Mode | Contact Mode |
| Peak Arc Current | 100 A |
| Pulse Duration | 20 µs |
| Repetition Rate | 100 Hz |
| Processing Time | 5 min |

The results obtained for various examples of particle production, using the common features detailed in Table 1, are presented in Table 2. The results include a characterization of the particles, along with a brief description of the particulars of the production and collection thereof.

TABLE 2

Examples of produced particles

| Ex | Elect. Mat. | Elect. 1 cross-section, mm | Elect. 2 size, mm | Collection | Particle Description | Particle size | Feature Size | Micrograph FIG. |
|---|---|---|---|---|---|---|---|---|
| 1 | C | 1 × 4 | 10 × 10 | Top | C nano-particle | ~20 nm | Cavity ~5 nm | 2 |
| 2 | Ni | 5 × 2.5 | 80 × 5 | Precipitate | Ball with fibrous surface | ≦25 μm | Surface nanotubes or nanofibers 2.8-6.8 nm diam | 3 |
| 3 | Ni | 5 × 2.5 | 80 × 5 | Precipitate | Ball with smooth surface | ≦25 μm | | 4 |
| 4 | Ni | 5 × 2.5 | 80 × 5 | Top | Ni spherical particle | 5-8 nm | | 5 |
| 5 | Ni | 5 × 2.5 | 80 × 5 | Top | C onions | 15-20 nm | Onion complex ~50-60 nm | 6, 7 |
| 6 | Fe | 5 × 2.5 | 80 × 5 | Precipitate | Ball with shell | ≦25 μm | Surface nanoparticles ~50 nm | 8 |
| 7 | W | 5 × 2.5 | 80 × 5 | Precipitate | Ball with shell | ≦10 μm | Surface nanoparticles ~50 nm | 9 |
| 8 | W | 5 × 2.5 | 80 × 5 | Top | W particle | 3-4 nm | | 10 |

In all of the particle production examples, the contact mode was employed between a pair of arc electrodes composed of the same material, but having different shapes and sizes, as detailed in Table 2. The particles were collected by one of two methods, as indicated by the column labeled "collection" in Table 2. In the "top" method, a small quantity of liquid was removed from near the surface of the vessel using a pipette, and transferred to either a glass microscope slide, in some cases with a 50 nm Au film pre-deposited upon it, or to an amorphous carbon coated Cu grid used for transmission electron microscopy (TEM). The liquid was allowed to evaporate, and the sample was examined using scanning electron microscopy (SEM) or TEM. In the "precipitate" method, a glass microscope slide, sometimes having a 50 nm Au film, was placed on the bottom of vessel 10 after arc processing. The liquid was allowed to evaporate, and then the slide was removed. The precipitate on the slide was then examined by SEM.

When the liquid was arc-treated with carbon electrodes (Example 1 in Table 2), and liquid removed from the top of vessel 10 was placed on a TEM grid, hollow C nanoparticles were observed, typically having an external diameter of 20 nm, and an interior diameter of 5 nm. The C composition was verified by electron diffraction analysis. In this example, the C atoms may have originated from either the graphite electrodes or from the alcohol liquid. A photograph of a typical particle is shown in FIG. 2.

When the liquid was arc-treated with Ni electrodes (Examples 2-5 in Table 2), various types of particles were observed. Samples, collected with an uncoated glass slide using the precipitate method, and examined by SEM, consisted of flat islands with a characteristic size of ~20-40 μm separated by cracks (FIG. 3a). Some spherical particles were disposed on the islands. The particle diameters ranged from sub-μm up to 25 μm (FIG. 3b). The surface of most of the spherical particles was highly textured (Example 2), while some had a smoother surface, as shown in FIG. 4 (Example 3). Higher-magnification SEM of the textured particles showed that the surface was composed of a fibrous substructure, where each "fiber" typically had a diameter of 3-7 nm and a length of 100-200 nm (FIG. 3c). EDX (Energy Dispersive X-ray) analysis of the general area of the precipitate indicated that the composition of the material was 72.5 atom % (at. %) C and 27.5 at. % Ni. EDX analysis showed that the spheres with highly textured surfaces were composed of 64.5 at. % C and 35.5 at. % Ni, while the smooth particles consisted of 33.38 at. % C and 64.62 at. % Ni. X-ray photoemission spectroscopy (XPS) combined with ion milling was used to determine the composition depth profile of the outler layer of a typical highly-textured particle. It was found that the surface contained about 80 at. % C and 20 at. % Ni. With increasing depth, the C fraction decreased, and the Ni fraction increased, reaching 70 at. % C and 30 at. % Ni at an approximate depth of 20 nm. These results suggest that carbon (which only could originate from the liquid) formed the fibrous substructure, on top of a spherical particle whose core was composed mainly of Ni.

Approximately 10 drops of liquid were removed from the top surface of the liquid and placed on a TEM grid (Example 4 in Table 2). After the alcohol evaporated, the grids were examined by TEM. Example 4 contained spherical particles with typical diameters of 5-8 nm (FIG. 5). High resolution TEM showed an ordered crystalline arrangement, with a spacing between adjacent planes of 0.2 nm. EDX analysis, performed within the TEM, showed that the composition was Ni.

Example 5 in Table 2 was obtained under slightly different conditions than the other examples. The liquid was placed in a rectangular vessel 300 mm long, 100 mm wide, and filled to depth of 40 mm with alcohol. The liquid was arc-treated with Ni electrodes, which were placed at one end of the vessel for 5 minutes, using the parameters specified in Table 1. The vessel with the treated liquid was left to rest for a period of 3 hours. Approximately 10 drops of liquid were then removed from the top surface of the liquid, directly above the electrodes, and placed on a TEM grid (Example 5 in Table 2). After the alcohol evaporated, the grids were examined by TEM. Particles with an onion-like structure, i.e., composed of concentric spherical layers, were observed in Example 5 (FIG. 6). These particles typically had an outside diameter of 15-20 nm, and the diameter of the interior void was approximately 5-8 nm. EDX analysis performed within the TEM indicated that the composition of these "onions" was pure C. In some cases, the onions were clustered together, such that the typical cluster size was 50-60 nm, as shown in FIG. 7.

A liquid sample treated with Fe electrodes according to the parameters of Table 1 was removed using the "precipitate" method (Example 6 in Table 2). The morphology of the sample, as viewed using SEM, was similar to example 2, i.e., islands separated by cracks. As shown in FIG. 8a, which is an SEM micrograph made using back-scattered (BS) electrons, lighter-toned spherical particles are seen protruding through the surface of the darker background. These particles had diameters of up to 25 μm. FIG. 8b shows a higher-magnification SEM of the surface of a particle, and FIG. 8c presents an even higher magnification, showing spheroidal nanostructures on the surface of the particle. The lighter tone of the particles in the BS-SEM microgram (FIG. 8a) suggests that the particle is composed of a higher fraction of heavier atoms, i.e., Fe, than the background "island" material.

Liquid was treated with W electrodes according to the parameters in Table 1, and removed using the "precipitate"

and the "top", and referred to as examples 7 and 8, respectively, in Table 2. A series of SEM micrographs with increasing magnification is shown in FIGS. 9a, b, c. The surface of the precipitate consisted of rounded particles with diameters of up to 10 μm, and with a rough surface. The features which roughened the particle surface was also rounded, and had typical sizes of ~50 nm. EDX analysis showed the presence of W and C. The particles observed in the sample prepared from the "top" liquid were typically spherical, with diameters of 3-4 nm (FIG. 10). Crystalline planes were observable in the high resolution TEM micrographs. EDX analysis showed that these nano-particles were composed of pure W.

Particle Settling and Segregation

During arc treatment of the liquid, bubbles formed around the electrodes and the transparency of the liquid decreased with time, such that by the end of the arc treatment, all of the fluids had a black color, but of different opacities. The liquids treated with Ni and Fe electrodes (Examples 2-5 in Table 2) were darker than the liquids treated with C and W electrodes (Examples 1 and 6-7 in Table 2). After the arc treatment, the liquids treated with Ni electrodes (Examples 2-4 in Table 2) increasingly regained their transparency with time, and were relatively clear after 15-45 minutes under ambient room conditions. The liquids treated with C, W, and Fe electrodes (Examples 1 and 5-7) remained dark, however, until all of the liquid evaporated.

During the course of evaporation of the liquid treated with Ni electrodes, a black band was deposited on the interior surface of vessel 10 at approximately the height of the original liquid level, and a black precipitate was deposited on the bottom of the vessel. Liquids treated with W, Fe or C electrodes produced a black deposit at all heights of the vessel wall.

Electrical and Magnetic Segregation

Electrical collection of particles was observed in several experiments. Arc-treated liquid in vessel 10 with Ni electrodes was subsequently stirred and transferred to a Petri dish having an internal diameter of 52 mm, and 8 mm depth of liquid placed therein, into which was placed a pair of copper electrodes (51×7×5 mm) spaced 5 mm apart. The Petri dish was then placed on the stage of an optical metallurgical microscope. The microscopic image was photographed with a digital camera operating in a movie mode. By examining sequential frames of the movie, the velocity of individual particles suspended in the liquid could be determined. Without applying any voltage to the electrodes, particles with sizes of ~25 μm were observed randomly moving with velocities (V) of approximately ~0.3-0.5 mm/s. When a voltage of 300 V (d.c.) was applied between the electrodes, the particles were observed to move in the direction generally perpendicular to the positive electrode with velocities of approximately $V_E$~2.5-3.5 mm/s. In another experiment, liquid was treated by an arc with Ni electrodes and transferred to a Petri dish with electrodes as described above, and a voltage of 500 V (d.c.) was applied between the electrodes. The arc-treated liquid was initially black. Within a period of 10-15 minutes, the liquid between the electrodes became transparent, and a black coating appeared on the positive electrode. However, the liquid not disposed directly between the electrodes remained black. The electrodes were weighed before and after the experiment. The mass gain, shown in FIG. 11, demonstrates that the particles were selectively collected by the positive electrode.

A similar set of experiments was conducted with liquid that was treated with an arc, using W electrodes. The treated liquid was placed in a Petri dish with electrodes, between which a potential of 500 V (d.c.) was applied, and a similar phenomenon, in which the liquid clarified from a black color and became transparent, was observed. However, the mass change of the electrodes was negligible.

Liquids subjected to the arc treatment with Ni electrodes or with Fe electrodes and still disposed within vessel 10 were subjected to a magnetic field produced by a permanent magnet placed adjacent to the exterior wall of the vessel. When the liquid was tested a short time after arc treatment, it was observed that the liquid adjacent to the magnet became darker, while liquid remote from the magnet became lighter, i.e., the particles within the liquid were attracted to the magnet. When the liquid was allowed to partially evaporate, so as to concentrate the particles, and when the magnet was placed adjacent to the exterior wall of the vessel, slightly above the level of the free surface of the liquid, it was observed that the liquid meniscus rose by about 1-2 mm. Liquid subjected to arc treatment with W electrodes did not exhibit the above-described magnetic attraction.

In another embodiment, metal carbide particles are synthesized using metal electrodes and a carbon-containing liquid, such as alcohol. In one embodiment, WC particles are synthesized, using W electrodes and liquid alcohol. The particles are mixed with larger carbide particles to form a mixture of particles in which the space between the larger particles is partially filled by the microparticles and nanoparticles produced by the arc treatment. In one embodiment, the microparticles and nanoparticles are added to the larger particles as a suspension in the liquid from which they were created. The liquid is used to aid in the dispersion and mixing of the small particles with the larger particles. The mixture is then heated, and the liquid evaporates. By heating the mixture to a sufficiently-high temperature, sintering will occur, binding all of the particles into a single solid body.

In another embodiment, production and separation are conducted simultaneously in a continuous process, in which liquid flows past one region containing at least one pair of arc electrodes, and then continues past another region in which the particles are collected. The collection may be by means of sedimentation, electrical attraction, or magnetic attraction. By arranging a series of collectors sequentially along the liquid flow path, the particles can be segregated by their density, electrical charge, or magnetic moment. The liquid, after particle removal, can be re-circulated to the electrode region. An example of this embodiment is shown schematically in FIG. 12. Here, particles produced by pulsed arcs in liquid in the production region 120, are transported into the collection region 130. Electrically charged particles are collected using a sequence of upper electrodes 181-183 and lower electrodes 191-193, between which potentials V1-V3 are imposed using power supplies 171-173, respectively. The arrows indicate the general direction of the liquid flow, which transports the suspended particles. Liquid is re-circulated from the end of collection region 130 back to production region 120 with the aid of pump 140. In some embodiments, the vessel containing the liquid may be closed, so as to minimize evaporation. In some embodiments, means may be provided to periodically or continuously replenish liquid lost to evaporation.

A liquid with suspended particles may be useful in certain applications. For example, oil containing suspended spherical nano-particles may be a very effective lubricant. Low vapor pressure liquids with suspended magnetic particles form a magnetic fluid which is used to seal motion feedthroughs for vacuum systems. In one embodiment of the invention, liquids with suspended particles is produced by treating the liquid with a sequence of pulsed arc discharges between electrodes of a suitable material.

Mechanism of Action

Without wishing to be limited by theory, a mechanism of action is elaborated herein. Electrical discharges in liquids are known in the scientific literature, and are employed in various technological devices and processes, including oil-filled circuit breakers and electrical discharge or electrodynamic machining (EDM). The discharge may be established by "drawing an arc", in which two electrical contact through current is flowing are drawn apart. The surfaces of technical contacts are never perfectly smooth, but rather consist, on a microscopic scale, of numerous depressions and protuberances. Generally, electrical contact is made where protuberances from opposing contacts touch each other. If the contacts were perfectly rigid, contact would be made at only one pair of protuberances. However, the surface, and in particular the protuberances thereon, deform elastically and plastically under the pressure of the force applied to hold the two contacts together. However, as the force is relieved and reversed in order draw apart the contacts, at the last moment of contact, the current is forced to flow through a very narrow bridge formed by the last protuberances in contact. Very strong Ohmic heating, along with poor thermal conduction, cause this conducting bridge to overheat and explode, forming a vapor of the contact material. If the explosion temperature is sufficient, the vapor is partially ionized, forming a conducting plasma which will continue to conduct the current, which will further heat the plasma.

Alternatively, the electrical discharge may be initiated by electrical breakdown, by applying a voltage between two electrodes not in contact with each over, with sufficient amplitude to overcome the dielectric strength of the liquid medium between the electrodes. The electrical breakdown process generally involves a cascade reaction wherein a free electron is accelerated by the electrical field to sufficient energy to ionize an atom or molecule with whom the free electron collides, producing an electron-ion pair. Two electrons are now available, and can likewise be accelerated and collide with atoms, producing two additional free electrons, and so forth in a chain reaction.

Regardless of how the electrical discharge is ignited, once started, the current flow is controlled by a combination of the power supply driving the current and the characteristics of the plasma formed between the electrodes. In the present invention, the plasma will consist of some combination of evaporated liquid and evaporated electrode material. Typically, discharge plasmas reach temperatures on the order of a few eV, i.e., a few tens of thousands of degrees Kelvin. The plasma is typically in the form of a bubble, surrounded by the relatively cool (compared to the plasma temperature) electrode surfaces, and a surrounding liquid wall. Within the plasma, the atoms and molecules will suffer collisions with energetic electrons, which can cause excitation, ionization, and disassociation of the atoms or molecules present. These species may collide among themselves, and form new molecules or radicals. It is likely that the walls of the bubble, i.e., the electrode and liquid surfaces surrounding the bubble, are favorable locations for condensation of solid particles, formed by some combination of the atoms originating from the liquid and from the electrodes. In some respects, the processes occurring within the plasma and at the boundary between the plasma and the surrounding solid or liquid combine some aspects of physical vapor deposition (PVD) and chemical vapor deposition (CVD). Formation of a condensable plasma by arc evaporation of electrode material commonly occurs in vacuum arc deposition, for example, which is a PVD variant. The use of vaporized liquid feedstock is well known in CVD. The combination of the two, within a bubble in a liquid ambient, is novel and inventive.

The instantaneous pressure within the plasma bubble is likely to be quite high, encouraging plasma chemical reactions. The rapid formation of the plasma bubble, and its rapid collapse, are likely to generate high pressure compression waves within the surrounding liquid. It is possible that the waves play a role in dispersing solid particles which are formed, and possibly in dislodging particles which may have formed on the electrode surface.

Segregation and collection of the particles according to the invention may be accomplished by some combination of evaporation, sedimentation, electric fields, or magnetic fields, depending on the particle material. Sedimentation is a gravitational effect, in which heavier particles will be pulled towards the bottom of the vessel faster than lighter particles, upon which forces binding it to the liquid, and hence tending to keep the particle in suspension, may be relatively larger. The electrical collection of particles demonstrated in this invention may possibly proceed from the known electrochemical corrosion effect, wherein metals, in particular, release positive ions into a surrounding liquid, and thus a negative charge is left on the particle. This corrosion-charging process proceeds only until equilibrium is reached with the surrounding electrolyte, wherein the electric field generated by the negative charge is sufficient to pull back ions which would otherwise be released to the liquid. Magnetic collection was shown to be effective when ferromagnetic materials such as Ni or Fe were used as the discharge electrodes.

As used herein in the specification and in the claims section that follows, the term "microparticles" refers to particles whose size is 100 microns or less.

As used herein in the specification and in the claims section that follows, the term "nanoparticles" refers to particles whose size is 100 nanometers or less.

As used herein in the specification and in the claims section that follows, the expression "microparticles being associated with the plasma bubble" and the like, refers to particles created in or adjacent to the plasma bubble.

As used herein in the specification and in the claims section that follows, the expression "product (P) of the current amplitude and the pulse duration", and the like, refers to the multiplication of the current amplitude, and some measure of the pulse duration, such as the pulse width at the half-amplitude points.

As used herein in the specification and in the claims section that follows, the term "classification" refers to a process of collecting particles such that they are sorted or partially sorted according to type, composition or size.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of producing microparticles comprising the steps of:
   (a) providing a system including:
      (i) a vessel containing a liquid;
      (ii) at least a first pair of electrodes;
      (iii) a mechanism for igniting an electrical arc between said electrodes;
   (b) disposing said first pair of electrodes within said liquid, and
   (c) effecting at least one pulsed electrical discharge between said electrodes so as to produce a plasma bubble, and to produce the microparticles, the microparticles being associated with said plasma bubble, wherein said pulsed electrical discharge has a pulse duration of less than 1000 microseconds, and wherein said pulsed electrical discharge has a current amplitude of at least 1 ampere (A).

2. The method of claim 1, wherein said pulse duration is less than 100 microseconds.

3. The method of claim 1, wherein said pulse duration is less than 50 microseconds.

4. The method of claim 3, wherein said pulsed electrical discharge has a current amplitude of at least 10 A.

5. The method of claim 3, wherein said pulsed electrical discharge has a current amplitude of at least 10 A and less than 100 A.

6. The method of claim 1, wherein said pulse duration is less than 30 microseconds.

7. The method of claim 1, wherein said pulse duration is less than 10 microseconds.

8. The method of claim 1, wherein said pulse duration is less than 3 microseconds.

9. The method of claim 1, wherein said pulse duration is less than 1 microsecond.

10. The method of claim 1, wherein said pulsed electrical discharge is repeatedly applied.

11. The method of claim 1, wherein said pulsed electrical discharge is repeatedly applied at a frequency in a range of 10 Hertz to 1 MHertz.

12. The method of claim 1, wherein said electrical discharge is ignited by drawing an arc.

13. The method of claim 12, wherein said pulsed electrical discharge between said electrodes is a plurality of pulsed electrical discharges, said discharges being effected by a periodical contacting of a first electrode of said first pair of electrodes with a second electrode of said first pair of electrodes.

14. The method of claim 13, wherein one of said first pair of electrodes is mounted on a vibrating mechanism which effects said periodical contacting between said first pair of electrodes.

15. The method of claim 1, wherein the microparticles have a particle size distribution (PSD), the method further comprising the step of:
(d) controlling a function of a product (P) of said current amplitude and said pulse duration, so as to control said PSD of the microparticles.

16. The method of claim 1, wherein the microparticles have a particle size distribution (PSD), and wherein said PSD is shifted towards more particles of smaller sizes by decreasing a product (P) of said current amplitude and said pulse duration, the method further comprising the step of:
(d) controlling P so as to control said PSD of the microparticles.

17. The method of claim 16, wherein P is controlled such that said PSD has a median particle size below 100 nanometers.

18. The method of claim 16, wherein P is controlled such that said PSD has a median particle size below 20 nanometers.

19. The method of claim 1, wherein said effecting of said pulsed electrical discharge is controlled such that said liquid contributes atoms to the microparticles.

20. The method of claim 1, wherein said liquid includes an alcohol.

21. The method of claim 1, wherein said liquid includes kerosene.

22. The method of claim 1, wherein said liquid contains atoms of sulfur.

23. The method of claim 1, wherein said liquid contains atoms of at least one of the elements selected from the group consisting of molybdenum, tungsten, and sulfur.

24. The method of claim 1, wherein at least one of said first pair of electrodes is a metal.

25. The method of claim 1, wherein at least one of said first pair of electrodes contains a material selected from the group consisting of iron, nickel, tungsten, and carbon.

26. The method of claim 1, wherein at least one of said first pair of electrodes is fabricated from graphite.

27. The method of claim 1, wherein at least one of said first pair of electrodes is fabricated from silicon.

28. The method of claim 1, wherein said effecting of said pulsed electrical discharge is controlled so as to collapse said plasma bubble.

29. The method of claim 1, further comprising the step of:
(d) removing the microparticles produced by said electrical discharge.

30. The method of claim 29, wherein said removing of the microparticles is effected by evaporation of said liquid.

31. The method of claim 29, wherein said removing of the microparticles is effected by sedimentation.

32. The method of claim 29, further comprising the step of:
(d) effecting a classification of the microparticles produced by said electrical discharge.

33. The method of claim 32, wherein said classification includes classification based on a relative particle size of the microparticles.

34. The method of claim 32, wherein said classification includes classification based on a magnetic property of at least a portion of the microparticles.

35. The method of claim 32, wherein said classification includes classification based on an electrical property of at least a portion of the microparticles.

36. The method of claim 29, wherein the microparticles have an electrical charge when disposed in said liquid, and wherein said removing is effected by:
(i) placing at least one collector electrode into said liquid;
(ii) imposing a bias voltage upon said collector electrode;
(iii) allowing the microparticles to be attracted to said collector electrode having said bias voltage, and
(iv) removing said collector electrode from said liquid.

37. The method of claim 29, wherein the microparticles have a magnetic charge, and wherein said removing is effected by:
(i) placing a magnet in the liquid;
(ii) allowing the microparticles to be attracted to said magnet, and
(iii) removing said magnet from said liquid.

38. The method of claim 29, wherein said removing of the microparticles is effected by at least one collector placed in said liquid, and said liquid is caused to flow from said electrodes to said collector.

39. The method of claim 38, wherein said liquid, after flowing to said collector, is re-circulated to a vicinity of said electrodes.

40. The method of claim 38, wherein said liquid is added to said vessel in controlled amounts.

41. The method of claim 29, wherein said removing of the microparticles is effected by at least two collector electrodes, said collector electrodes being disposed at different depths within said liquid.

42. The method of claim 29, wherein said removing of the microparticles is effected by removing a portion of said liquid from a specified height from a bottom of said vessel.

43. The method of claim 42, wherein said height is within an upper 10% of a height of said liquid within said vessel.

* * * * *